(12) United States Patent
Kanemitsu

(10) Patent No.: US 7,010,428 B2
(45) Date of Patent: Mar. 7, 2006

(54) DRIVING SUPPORT SYSTEM, DRIVING SUPPORT APPARATUS AND DRIVING SUPPORT METHOD

(75) Inventor: Hiroyuki Kanemitsu, Gotemba (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/724,883

(22) Filed: Dec. 2, 2003

(65) Prior Publication Data

US 2004/0122587 A1    Jun. 24, 2004

(30) Foreign Application Priority Data

Dec. 18, 2002    (JP) .............................. 2002-367059

(51) Int. Cl.
*G06F 17/10*    (2006.01)
*G06G 7/78*    (2006.01)

(52) U.S. Cl. ...................................... 701/300; 701/301
(58) Field of Classification Search ................ 701/300, 701/301, 117
See application file for complete search history.

(56) References Cited

U.S. PATENT DOCUMENTS

| | | | |
|---|---|---|---|
| 5,907,293 A | 5/1999 | Tognazzini | |
| 6,252,520 B1 | 6/2001 | Asami et al. | |
| 6,326,903 B1 | 12/2001 | Gross et al. | |
| 6,327,536 B1 | 12/2001 | Tsuji et al. | |
| 2003/0060980 A1 * | 3/2003 | Prakah-Asante et al. | 701/301 |
| 2003/0139881 A1 * | 7/2003 | Miller et al. | 701/301 |
| 2003/0149530 A1 * | 8/2003 | Stopczynski | 701/301 |
| 2003/0191586 A1 * | 10/2003 | Miller et al. | 701/301 |
| 2003/0212288 A1 * | 11/2003 | Lenges et al. | 558/332 |
| 2004/0073366 A1 * | 4/2004 | Jones | 701/301 |

FOREIGN PATENT DOCUMENTS

| | | |
|---|---|---|
| EP | 0 841 648 A2 | 5/1998 |
| JP | A 4-290200 | 10/1992 |
| JP | A 5-266399 | 10/1993 |
| JP | A 2000-207691 | 7/2000 |

* cited by examiner

*Primary Examiner*—Thomas G. Black
*Assistant Examiner*—Brian J. Broadhead
(74) *Attorney, Agent, or Firm*—Kenyon & Kenyon (57) ABSTRACT

A driving support apparatus included in a vehicle in a system which uses running data on another vehicle, that is transmitted from the other vehicle, is provided with extracting means for preparing vector mapping data including plural running vectors based on positional information and speed information transmitted from at least one other vehicle, and for extracting a running path of the at least one other vehicle from the prepared vector mapping data.

15 Claims, 6 Drawing Sheets

DRIVING SUPPORT SYSTEM, DRIVING SUPPORT APPARATUS AND DRIVING SUPPORT METHOD

INCORPORATION BY REFERENCE

The disclosure of Japanese Patent Application No. 2002-367059 filed on Dec. 18, 2002 including the specification, drawings and abstract is incorporated herein by reference in its entirety.

BACKGROUND OF THE INVENTION

1. Field of the Invention

The invention relates to a driving support system and a driving support apparatus which provide a driver driving a vehicle with information on another vehicle whose estimated path will intersect with an estimated path of the vehicle through vehicle-to-vehicle communication. More particularly, the invention relates to a driving support system, a driving support apparatus and a driving support method which make it possible to accurately determine whether there is a possibility that an estimated path of a vehicle driven by a driver will intersect with an estimated path of another vehicle, even in the vehicle without a map database.

2. Description of the Related Art

As disclosed in Japanese Patent Laid-Open Publication No. 4-290200, a system or an apparatus has been developed which enables an exchange of running data such as present position information, running speed information and running direction information between vehicles through vehicle-to-vehicle communication, and which gives a warning to a driver driving a vehicle when detecting that there is another vehicle that is approaching an intersection ahead of the vehicle.

However, the technology disclosed in the above-mentioned publication can be realized only when the vehicle which employs the system or the apparatus is provided with a map database. Namely, it is determined whether there is a possibility that an estimated path of the other vehicle will intersect with an estimated path of the vehicle by checking the received position of the other vehicle against the map database.

Varieties of performance, specifications and equipment of vehicles running on ordinary roads are broad, and not all the vehicles are provided with a map database (and a navigation system or the like for using the map database) that is relatively expensive. In a vehicle without a map database, when a running vector of another vehicle is compared with a running vector of the vehicle, a road state is not taken into consideration. Accordingly, even when there is the other vehicle running on a road that does not intersect with a road on which the vehicle is running, it may be determined that an estimated path of the other vehicle will intersect with an estimated path of the vehicle. Meanwhile, even when there is the other vehicle running on a road that intersects with the road on which the vehicle is running, it may be determined that the estimated path of the other vehicle will not intersect with the estimated path of the vehicle.

SUMMARY OF THE INVENTION

It is an object of the invention to provide a driving support system, a driving support apparatus and a driving support method for a vehicle, which make it possible to estimate a running path of another vehicle based on positional information received from the other vehicle, and which make it possible to accurately determine a possibility that an estimated path of the other vehicle will intersect with an estimated path of the vehicle even in the vehicle without a map database.

A driving support system according to a first aspect of the invention includes a first vehicle which can receive running data; and at least one second vehicle which can transmit the running data to the first vehicle. In the first vehicle, a running path of the second vehicle is estimated based on plural pieces of positional information included in the running data transmitted from the second vehicle.

According to the first aspect, plural running vectors may be prepared based on plural pieces of positional information and speed information which are transmitted from one running vehicle at different timings, may be prepared based on plural pieces of positional information and speed information which are transmitted from plural vehicles running at different positions, or may be prepared by combining the above-mentioned pieces of information. Thus, by observing vector mapping data on which the plural running vectors obtained in the above-mentioned manner are provided, it is possible to roughly estimate the running path of the first vehicle. By roughly estimating the running path of the first vehicle, it is possible to estimate the road configuration. Particularly, by obtaining the plural running vectors based on positional information and speed information obtained from the first vehicle running ahead of the first vehicle, the running path of the first vehicle can be roughly obtained in advance.

In the above-mentioned aspect, in the first vehicle, the possibility that the running vector of the second vehicle, which is prepared based on positional information and speed information on the second vehicle, will intersect with the running vector of the first vehicle may be determined using the estimated running path. Thus, it is possible to accurately determine the possibility that the estimated path of second vehicle will intersect with the estimated path of the first vehicle, even in the first vehicle without a map database.

In the above-mentioned aspect, in the first vehicle, the running vector of a following vehicle behind the second vehicle (hereinafter, referred to as a "third vehicle") may be corrected using acceleration information on the second vehicle. Thus, it is possible to determine the possibility that the estimated path of the third vehicle will intersect with the estimated path of the first vehicle in consideration of the traffic situation (for example, due to traffic congestion ahead of the third vehicle, there is a high possibility that the third vehicle will decelerate or stop).

According to a second aspect of the invention, a driving support apparatus which is provided in a first vehicle and which is used in a system that uses running data of at least one second vehicle, that is transmitted from the second vehicle, includes a communication portion which receives positional information and speed information on the second vehicle, and an extracting portion which prepares vector mapping data including plural running vectors based on the plural pieces of positional information and speed information transmitted from the second vehicle, and which extracts the running path of the second vehicle from the prepared vector mapping data.

According to the second aspect, plural running vectors may be prepared based on plural pieces of positional information and speed information which are transmitted from one running vehicle at different timings, may be prepared based on plural pieces of positional information and speed information which are transmitted from plural vehicles running at different positions, or may be prepared by combining the above-mentioned pieces of information. Thus, by observing vector mapping data on which the plural running vectors obtained in the above-mentioned manner are provided, it is possible to roughly estimate the running path of the first vehicle. By roughly estimating the running path of the first vehicle, it is possible to estimate the road configuration. Particularly, by obtaining the plural running vectors based on positional information and speed information obtained from the second vehicle running ahead of the first vehicle, the running path of the first vehicle can be roughly obtained in advance.

In the above-mentioned aspect, the driving support apparatus may further include a determining portion which determines the possibility that the running vector of the second vehicle, that is prepared based on positional information and speed information on the second vehicle, will intersect with the running vector of the first vehicle using the running path extracted by the extracting portion. Thus, it is possible to accurately determine the possibility that the estimated path of the second vehicle will intersect with the estimated path of the first vehicle, even in the first vehicle without a map database.

In the above-mentioned aspect, the determining portion may determine the possibility that the running vector of the third vehicle the second vehicle will intersect with the running vector of the first vehicle, after correcting the running vector of the third vehicle using acceleration information on the second vehicle. Thus, it is possible to determine the possibility that the estimated path of the third vehicle will intersect with the estimated path of the first vehicle in consideration of the traffic situation (for example, due to traffic congestion ahead of the third vehicle, there is a high possibility that the third vehicle will decelerate or stop).

In the above-mentioned aspect, the driving support apparatus may further include an image capturing portion which captures an image of an area ahead of the first vehicle and which generates image information on the area ahead of the first vehicle. The determining portion may determine the possibility that the running vector of the second vehicle will intersect with the running vector of the first vehicle using the running path extracted by the extracting portion and the image information obtained by the image capturing portion. Thus, even when traffic is light and the running vectors of the second vehicles cannot be obtained sufficiently, it is possible to estimate the running path of the first vehicle by taking the image information on the area ahead of the first vehicle into consideration, and to determine the possibility that the estimated path of the second vehicle will intersect with the estimated path of the first vehicle.

According to a third aspect of the invention, a driving support apparatus which is provided in a first vehicle and which is used in a system that uses running data of at least one second vehicle, that is transmitted from the second vehicle, includes a communication portion which receives positional information and speed information on the second vehicle, and extracting means for preparing vector mapping data including plural running vectors based on the plural pieces of positional information and speed information transmitted from the second vehicle, and for extracting the running path of the second vehicle from the prepared vector mapping data.

In the third aspect, the driving support apparatus may further include determining means for determining the possibility that the running vector of the second vehicle, that is prepared based on positional information and speed information on the second vehicle, will intersect with the running vector of the first vehicle using the running path extracted by the extracting means.

In the above-mentioned aspect, the determining means may determine the possibility that the running vector of a third vehicle behind the second vehicle will intersect with the running vector of the first vehicle, after correcting the running vector of the third vehicle using acceleration information on the second vehicle.

In the above-mentioned aspect, the driving support apparatus may further include image capturing means for capturing an image of an area ahead of the first vehicle and for generating image information on the area ahead of the first vehicle. The determining means may determine the possibility that the running vector of the second vehicle will intersect with the running vector of the first vehicle using the running path extracted by the extracting means and the image information captured by the image capturing means.

According to a fourth aspect of the invention, a driving support method for a first vehicle in a system which uses running data of at least one second vehicle, that is transmitted from the second vehicle, includes a first step of receiving positional information and speed information on the second vehicle, a second step of preparing vector mapping data including plural running vectors based on the plural pieces of positional information and speed information transmitted from the second vehicle, and a third step of extracting the running path of the second vehicle from the prepared vector mapping data.

According to the fourth aspect, plural running vectors may be prepared based on plural pieces of positional information and speed information which are transmitted from one running vehicle at different timings, may be prepared based on plural pieces of positional information and speed information which are transmitted from plural vehicles running at different positions, or may be prepared by combining the above-mentioned pieces of information. Thus, by observing vector mapping data on which the plural running vectors obtained in the above-mentioned manner are provided, it is possible to roughly estimate the running path of the first vehicle. By roughly estimating the running path of the first vehicle, it is possible to estimate the road configuration. Particularly, by obtaining the plural running vectors based on positional information and speed information obtained from the first vehicle running ahead of the first vehicle, the running path of the first vehicle can be roughly obtained in advance.

In the fourth aspect, the driving support method may further include a fourth step of determining the possibility that the running vector of the second vehicle, that is prepared based on positional information and speed information on the second vehicle, will intersect with the running vector of the first vehicle using the extracted running path. Thus, it is possible to accurately determine the possibility that the estimated path of the second vehicle will intersect with the estimated path of the first vehicle, even in the first vehicle without a map database.

In the above-mentioned aspect, in the fourth step, the possibility that the running vector of the third vehicle behind the second vehicle will intersect with the running vector of the first vehicle may be determined, after correcting the running vector of the third vehicle behind the second vehicle using acceleration information on the second vehicle. Thus, it is possible to determine the possibility that the estimated path of the third vehicle will intersect with the estimated path of the first vehicle in consideration of the traffic situation (for example, due to traffic congestion ahead of the third vehicle, there is a high possibility that the third vehicle will decelerate or stop).

In the fourth aspect, the driving support method may further include a fifth step of capturing an image of an area ahead of the first vehicle and generating image information on the area ahead of the first vehicle. The possibility that the running vector of the second vehicle will intersect with the running vector of the first vehicle may be determined using the running path extracted in the third step and the image information on the area ahead of the first vehicle. Thus, even when traffic is light and the running vectors of the second vehicles cannot be obtained sufficiently, it is possible to estimate the running path of the first vehicle by taking the image information on the area ahead of the first vehicle into consideration, and to determine the possibility that the estimated path of the second vehicle will intersect with the estimated path of the first vehicle.

In any of the above-mentioned aspects, transmission of positional information and speed information may be performed by unicasting, multicasting or broadcasting. Also, in any of the above-mentioned aspects, detection of a position and a speed of the first vehicle may be performed by an arbitrary method.

A fourth aspect according to the invention relates to a driving support system using the driving support apparatus.

BRIEF DESCRIPTION OF THE DRAWINGS

The forgoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

Hereafter, a first and a second embodiments of a driving support apparatus according to the invention and a system using the driving support apparatus will be described with reference to accompanying drawings.

Figure 1:
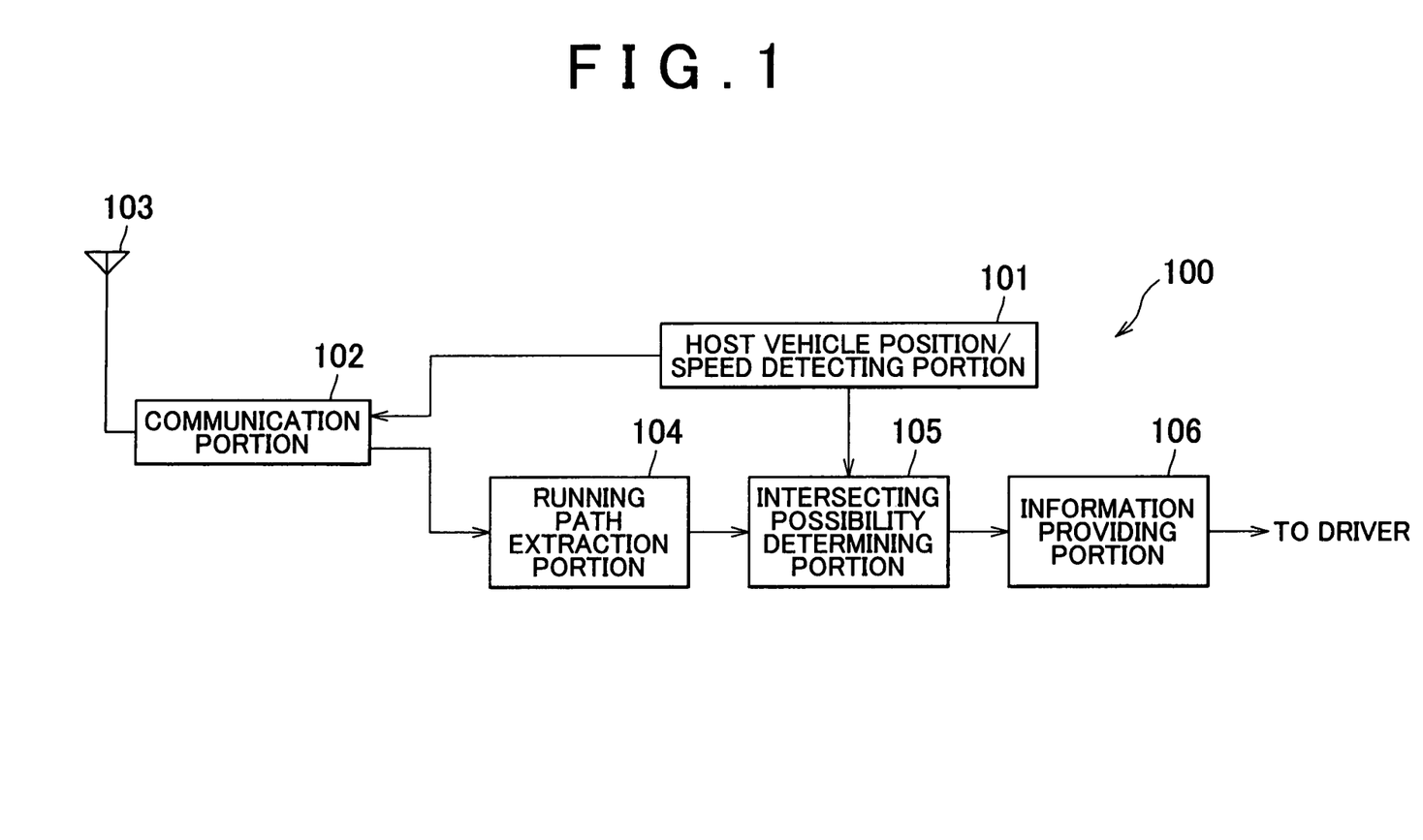
FIG. 1 is a functional block diagram of a driving support apparatus according to a first embodiment of the invention.

First, a configuration of the driving support apparatus mounted on a vehicle in the first embodiment of the invention will be described with reference to FIG. 1. FIG. 1 shows a functional block diagram of a driving support apparatus 100 according to the embodiment.

The driving support apparatus 100 for a vehicle according to the embodiment may be mounted on a vehicle during assembly of the vehicle, or may be mounted on the vehicle after assembly of the vehicle. Also, the driving support apparatus 100 may be mounted on the vehicle so as to be removable.

The driving support apparatus 100 includes a host vehicle position/speed detecting portion 101 which detects a present position and a present speed of the host vehicle, and prepares positional information and speed information. In the embodiment, a detecting method employed by the host vehicle position/speed detecting portion 101 may be arbitrary. Also, the host vehicle position/speed detecting portion 101 may detect another running data, for example, detecting acceleration of the host vehicle by monitoring a speed of the host vehicle.

The positional information and speed information (and another running data) detected by the host vehicle position/speed detecting portion 101 is transmitted by a communication portion 102 through an antenna 103. The transmission may be performed by unicasting, multicasting or broadcasting. Also, the positional information and the speed information may be transmitted in combination simultaneously, or may be transmitted as different data at different timings.

The driving support apparatus 100 further includes an extracting portion 104 which extracts a running path based on the positional information and speed information which are received from the other vehicle through the antenna 103 and the communication portion 102. A process performed by the extracting portion 104 will be described later in detail.

The driving support apparatus 100 further includes an intersecting possibility determining portion 105 which determines whether there is a high possibility that an estimated path of a vehicle will intersect with an estimated path of the host vehicle (for example, whether there is a vehicle which attempts to enter an intersection that the host vehicle attempts to enter from a different direction. Hereinafter, a vehicle whose estimated path will intersect with an estimated path of a host vehicle is referred to as an "intersecting vehicle"). A process performed by the intersecting possibility determining portion 105 will be described later in detail.

The driving support apparatus 100 further includes an information providing portion 106 which provides the driver with information and/or a warning concerning the presence of the intersecting vehicle.

The information and/or the warning may be visually provided on an instrument panel, may be visually provided on a front window as a hologram virtual image, may be acoustically provided from a speaker by voice, or may be provided in combination of these methods.

Also, as it is apparent to those skilled in the art, contents of the information and/or the warning to be provided and the timing of provision may be arbitrary.

Hereafter, an operation of the driving support apparatus 100 according to the embodiment will be described with reference to FIGS. 2A to 2C and FIG. 3. Particularly, a running path extracting process performed by the extracting portion 104 and an intersecting possibility determining process performed by the intersecting possibility determining portion 105 will be described in detail.

Figure 3:
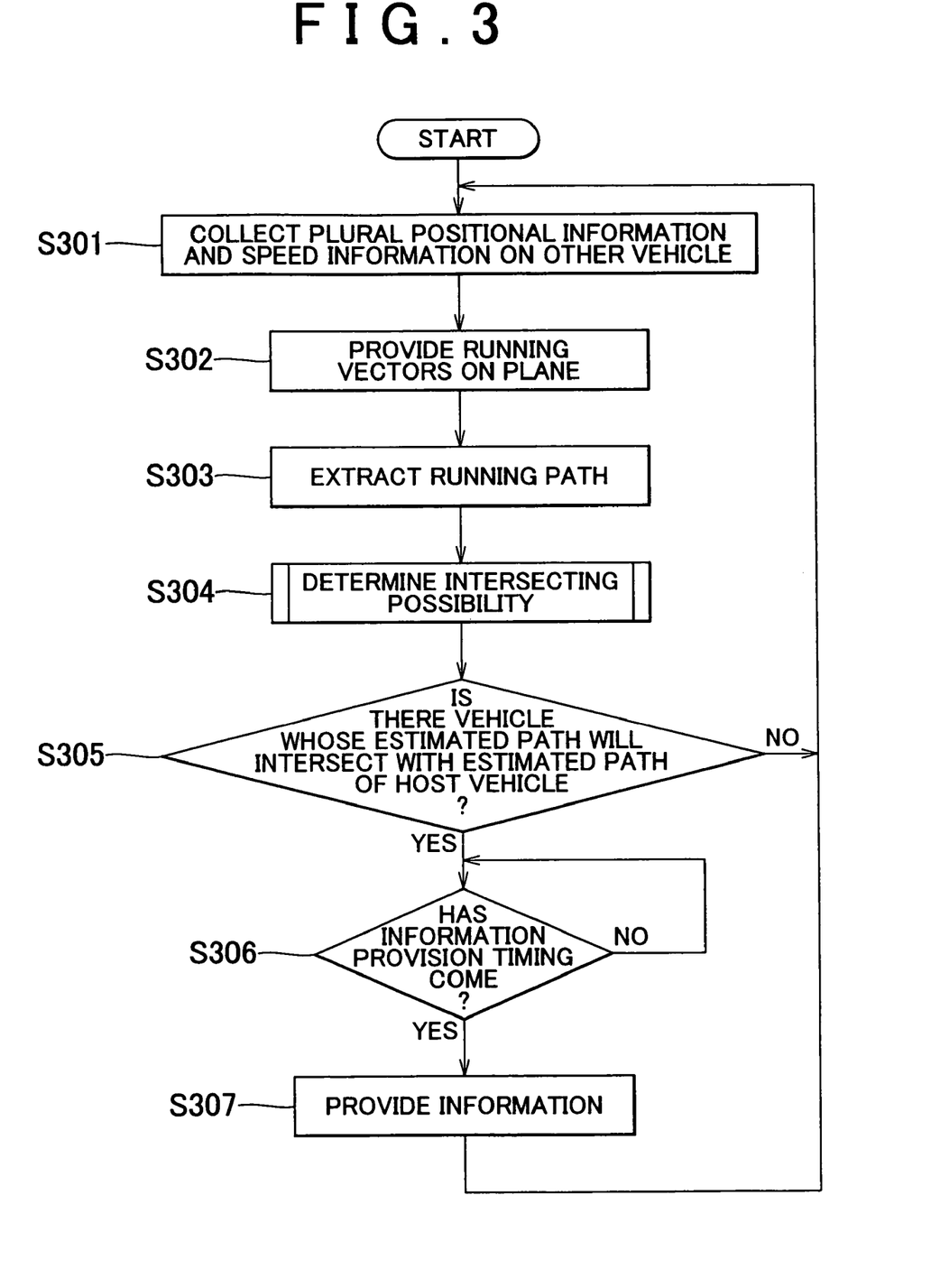
FIG. 3 is a flowchart showing a process performed by the driving support apparatus according to the first embodiment of the invention.

First, the extracting portion 104 performs a search for the positional information and the speed information which are transmitted from the other vehicle and collects plural pieces of positional information and speed information on the other vehicle (S301 in FIG. 3). The received positional information and speed information are shown as a running vector by using the position as a starting point and the speed as a length, and the running vector is stored.

In this case, "plural pieces of positional information and speed information on the other vehicle" may be plural pieces of information which are transmitted from one other vehicle at different timings, may be plural pieces of information which are transmitted from plural other vehicles simultaneously or substantially simultaneously, may be plural pieces of information which are transmitted from plural other vehicles at different timings, or may be plural pieces of information obtained by combining the above-mentioned pieces of information.

In any of the above-mentioned cases, the extracting portion 104 prepares plural running vectors each of which shows a position and a speed of one vehicle at a certain timing. It is preferable to decide the total number of vehicles from which positional information and speed information are collected in advance. For example, when positional information and speed information can be collected from many vehicles instantaneously in an environment where traffic is heavy, the information collection can be completed in a short time. On the other hand, in an environment where traffic is light, it is necessary to receive information from a small number of vehicles plural times. Therefore, it is necessary to continue monitoring until information (running vectors) from the predetermined total number of vehicle is collected.

Figure 2A:
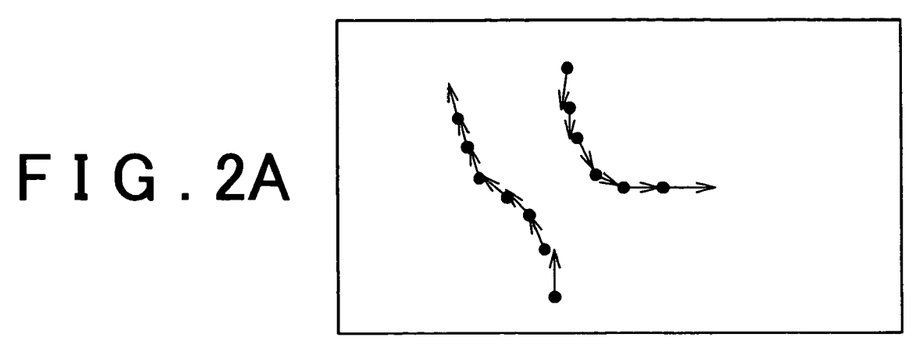
FIG. 2A is a pattern diagram showing an example of vector mapping data on which running vectors are provided.

Next, the extracting portion 104 provides the collected plural running vectors on a plane (S302 in FIG. 3). FIG. 2A shows an example of a result of mapping (referred to as "mapping data"). Black circles show positions of the vehicle, and arrows show vectors using a length as a speed.

Figure 2B:
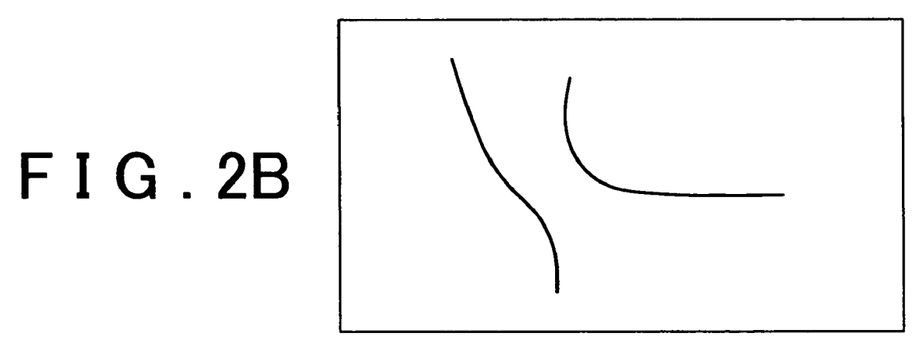
FIG. 2B is a pattern diagram showing an example of running path extracted from the vector mapping data including the running vectors.

Finally, the extracting portion 104 extracts a running path from the vector mapping data including the running vectors, for example, shown in FIG. 2A (S303 in FIG. 3). FIG. 2B shows an example of a case where the running path is extracted from the example of the vector mapping data shown in FIG. 2A.

In this case, each of the running vectors is prepared based on the present position which is transmitted from the other vehicle and detected in the other vehicle. Therefore, the accuracy varies from vehicle to vehicle. Accordingly, in the extraction of the running path, in consideration of the variation, it is preferable to extract the running path as a path having a width for offsetting an error to some extent.

Next, the intersecting possibility determining portion 105 determines the possibility that the running vector of the host vehicle will intersect with the running vector of the other vector (S304 in FIG. 3). Namely, the intersecting possibility determining portion 105 determines whether there is a vehicle having a running vector which may intersect with the running vector of the host vehicle. (S304 in FIG. 3). By performing intersecting possibility determination using the running vectors, it possible to determine that there is no vehicle whose estimated path will intersect with the estimated path of the host vehicle, when the travelling directions of the other vehicle and the host vehicle are completely different (when the running vector of the other vehicle does not intersect with the running vector of the host vehicle, considering the directions of the vectors), or when the other vehicle is being parked or stopped (when the length of the vector is zero).

Figure 4:
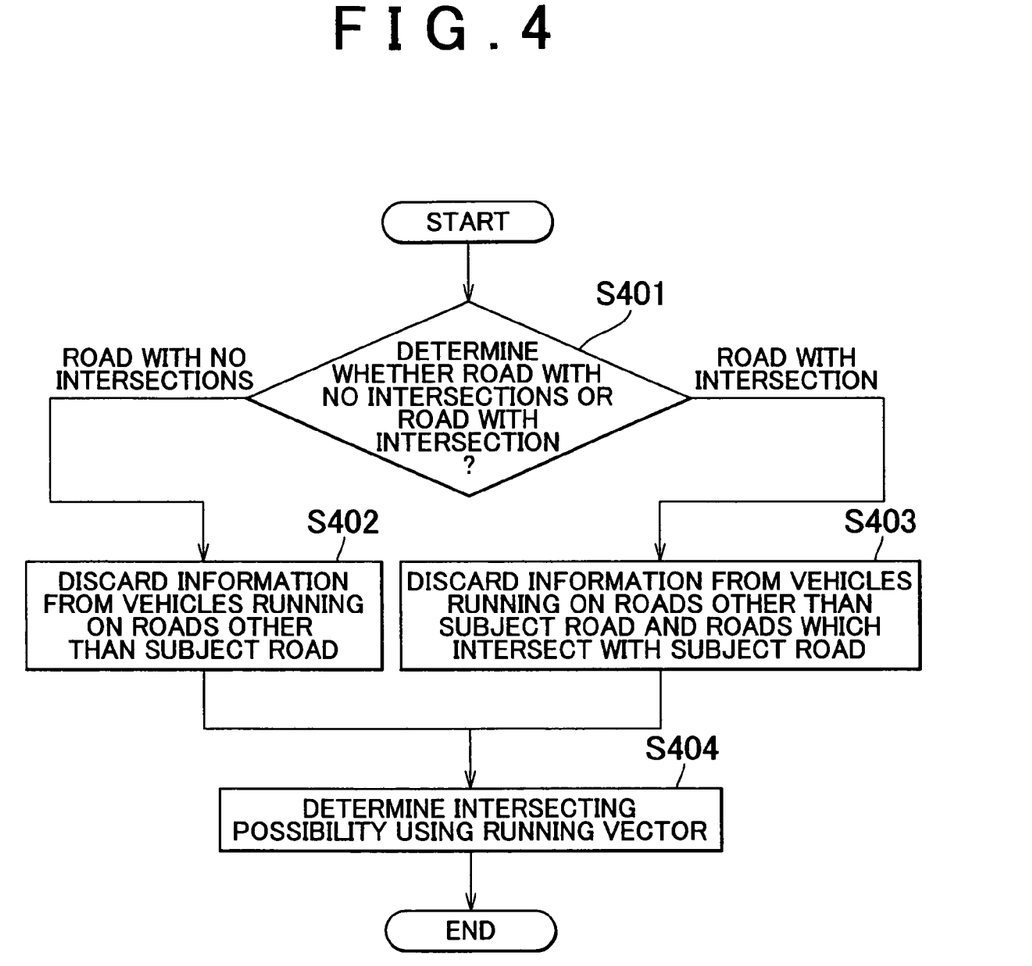
FIG. 4 is a flowchart showing a process in which the driving support apparatus according to the first embodiment of the invention determines the possibility that an estimated path of a vehicle will intersect with an estimated path of a host vehicle (hereinafter, referred to as a "intersecting possibility determining process)

FIG. 4 shows details of the intersecting possibility determining process in S304 in FIG. 3. First, the intersecting possibility determining portion 105 checks the position of the host vehicle against the extracted running path, for example, shown in FIG. 2B. and determines whether the road on which the host vehicle is running (hereinafter, simply referred to as a "subject road") is a road with no intersections or a road with an intersection (S401 in FIG. 4).

In the case of the road with no intersections, that is, in the case where it is determined that there is no road which intersects with the subject road for a while, it is necessary only to determine whether there is a vehicle running on the subject road, whose estimated path will intersect with the estimated path of the host vehicle. Therefore, information from the vehicles running on roads other than the subject road (that is, positional information and speed information which are shown by the running vectors) is discarded (S402 in FIG. 4).

On the other hand, in the case of the road with an intersection, that is, in the case where it is determined that there is a road which intersects with the subject road, information from the vehicles that are running on roads other than the subject road and the roads that intersect with the subject road, and whose estimated path will not intersect with the estimated path of the host vehicle (that is, positional information and speed information which are shown by the running vectors) is discarded (S403 in FIG. 4).

Information on the vehicle whose estimated path will intersect with the estimated path of the host vehicle, which is obtained according to the extracted running path, is ignored. Intersecting possibility determination is made only on the vehicles whose running path will intersect with the estimated path of the host vehicle, using the running vector (S404 in FIG. 4).

Figure 2C:
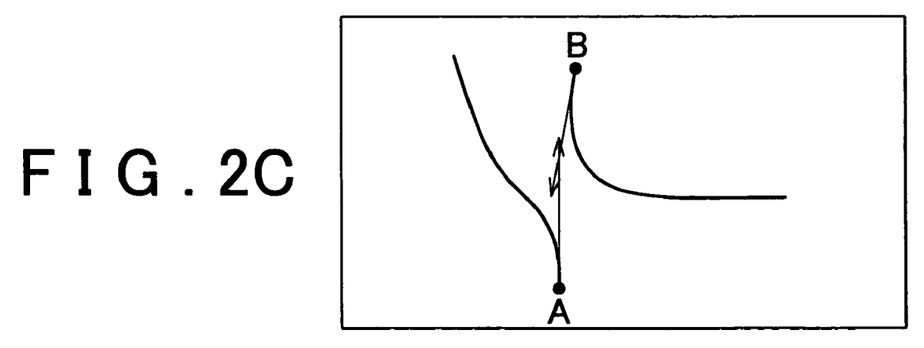
FIG. 2C is a pattern diagram showing an example of a case where two running vectors are on different roads with no intersections.

An example of intersecting possibility determination is shown in FIG. 2C. In this example, an example of the extracted running path shown in FIG. 2B is used as a precondition. It can be determined that there is the possibility that the running vectors of the vehicles A, B shown in the figure will intersect with each other, considering both the directions (the directions of the vectors) and the speeds (the lengths of the vectors). However, based on the extracted running path, it is determined that the vehicle A and the vehicle B are running on different roads (roads with no intersections) which do not intersect with each other, and there is no intersecting possibility.

As it is apparent to those skilled in the art, on the contrary to the example shown in FIG. 2C, even in the case where it can be determined that there is no intersecting possibility since the running vectors of the two vehicles are substantially parallel or are in the substantially opposite directions, when the extracted running path will intersect with a road with an intersection, it should be determined that there is an intersecting possibility.

As mentioned above, when the running path in addition to the running vector is taken into consideration, it is possible to provide appropriate information.

FIG. 3 will be described again. When the intersecting possibility determination (S304) is completed, and it is determined that there is no vehicle whose estimated path will intersect with the estimated path of the host vehicle ("NO" in S305), information is not provided to the driver and the process ends, afterwhich the process returns to S301. On the other hand, when it is determined that there is a vehicle whose estimated path will intersect with the estimated path of the host vehicle ("YES" in S305), it is determined whether the predetermined time for providing information has come (S306), and predetermined information (for example, a warning that there is an intersecting vehicle) is provided to the driver (S307).

As it is apparent to those skilled in the art, the timing at which the information is provided may be set arbitrarily. For example, the timing may be set such that the information is provided when the host vehicle reaches a point 150 meters before the intersection. Also, the contents of the information to be provided and the method for providing the information may be arbitrarily set. For example, a method may be employed in which information (or a warning) that there is an intersecting vehicle is visually provided on an instrument panel, and the information (or the warning) having the same contents is acoustically provided by voice.

Due to the information provision, the driver can recognize in advance that there is an intersecting vehicle even when the intersecting vehicle is not in sight of the driver. Accordingly, the driver can take actions such as performing steering and deceleration in order to avoid a collision.

When predetermined information is thus provided, the process returns to the state where information is collected from the other vehicle (S301).

According to the embodiment, even in the vehicle without a map database, it is possible to obtain the running path near the host vehicle by preparing the vector mapping data including the running vectors of the other vehicle, which are collected through vehicle-to-vehicle communication. Therefore, it is possible to provide the driver with appropriate information on a vehicle whose estimated path will intersect with the estimated path of the host vehicle.

Next, a second embodiment according to the invention will be described. A driving support apparatus according to the embodiment has the same configuration as the driving support apparatus according to the first embodiment. Therefore, figures and description thereof are omitted.

In the embodiment, in each vehicle, a traffic situation near another vehicle is estimated based on acceleration information (an amount of speed change during a past predetermined period) on the other vehicle ahead of the intersection, and a running vector of a following vehicle behind the other vehicle is corrected based on the estimated traffic situation.

In this case, the acceleration information on the other vehicle may be detected in the other vehicle and be transmitted from the other vehicle, or may be obtained in the vehicle which received the information, based on the speed information transmitted from the other vehicle.

Figure 5:
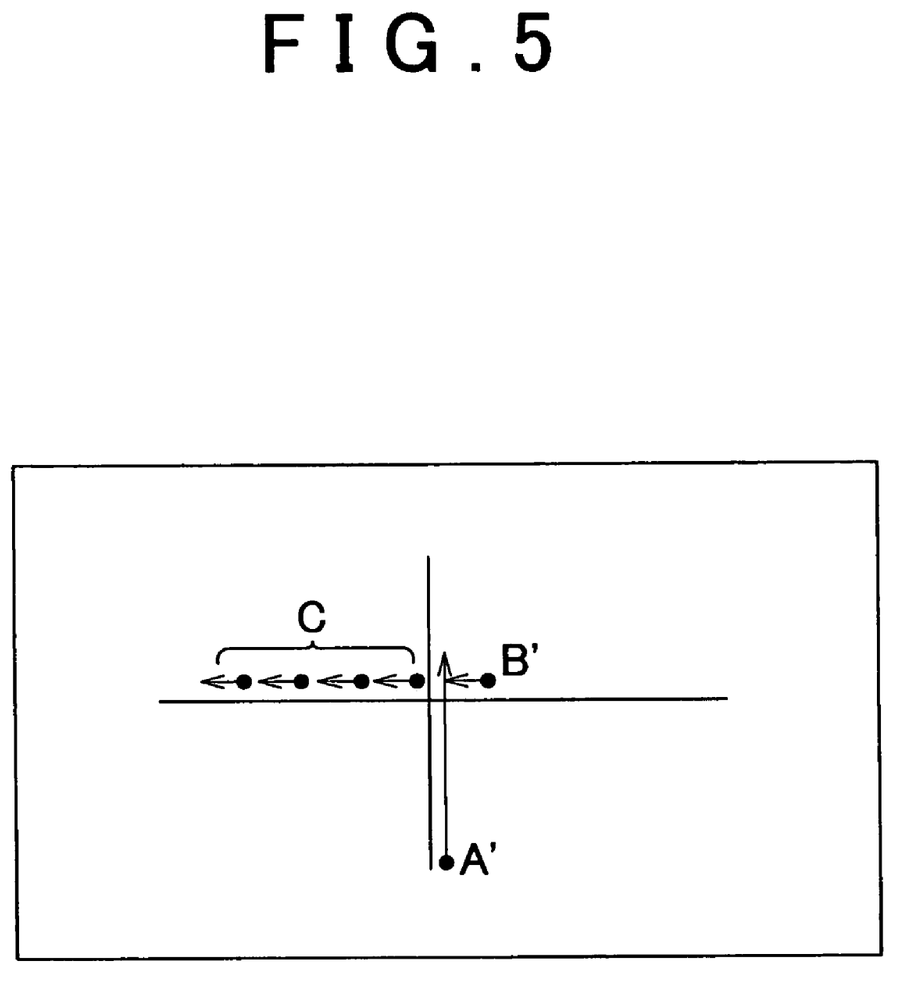
FIG. 5 is a pattern diagram showing an example of a case where running vectors of following vehicles behind the other vehicle are corrected based on a traffic situation ahead of an intersection.

An outline of the embodiment will be described with reference to an example shown in FIG. 5. In this case, a vehicle A' is a host vehicle, and a vehicle B' is another vehicle. It is determined that there is the possibility that the estimated path of the vehicle B' will intersect with the estimated path of the vehicle A', according to the first embodiment.

A group of vehicles C (hereinafter, referred to as a "vehicle group C") which is running ahead of and in the same direction as the vehicle B' is noted. The vehicle A' also receives information from each vehicle in the vehicle group C, and the information is not discarded (refer to S403 in FIG. 4). Accordingly, by monitoring the information transmitted from each vehicle in the vehicle group C, it is possible to obtain a traffic situation, for example, whether the vehicle group C is proceeding slowly due to traffic congestion or the like, or is stopped.

Since the traffic situation ahead of the other vehicle (in this case, the vehicle B') whose estimated path will intersect with the estimated path of the host vehicle is thus obtained, it is possible to estimate the behavior of the other vehicle. More particularly, it is possible to estimate that the vehicle B' drastically decelerates or stops before the intersection since the road ahead of the vehicle B' (in this case, the road ahead of the intersection where there is the vehicle group C) is congested. Also, it is possible to estimate that although the vehicle B' is proceeding slowly, the vehicle B' will accelerate and the speed thereof will be increased in a while since the congestion ahead of the intersection is reduced.

In the embodiment, before intersecting possibility of the running vectors is determined, when it is estimated that the vehicle whose estimated path will intersect with the estimated path of the host vehicle will decelerate or stop, the length of the running vector (scalar amount) of the vehicle whose estimated path will intersect with the estimated path of the host vehicle is decreased. When it is estimated that the vehicle whose estimated path will intersect with the estimated path of the host vehicle will accelerate, the length of the running vector (scalar amount) of the vehicle whose estimated path will intersect with the estimated path of the host vehicle is increased.

Figure 6:
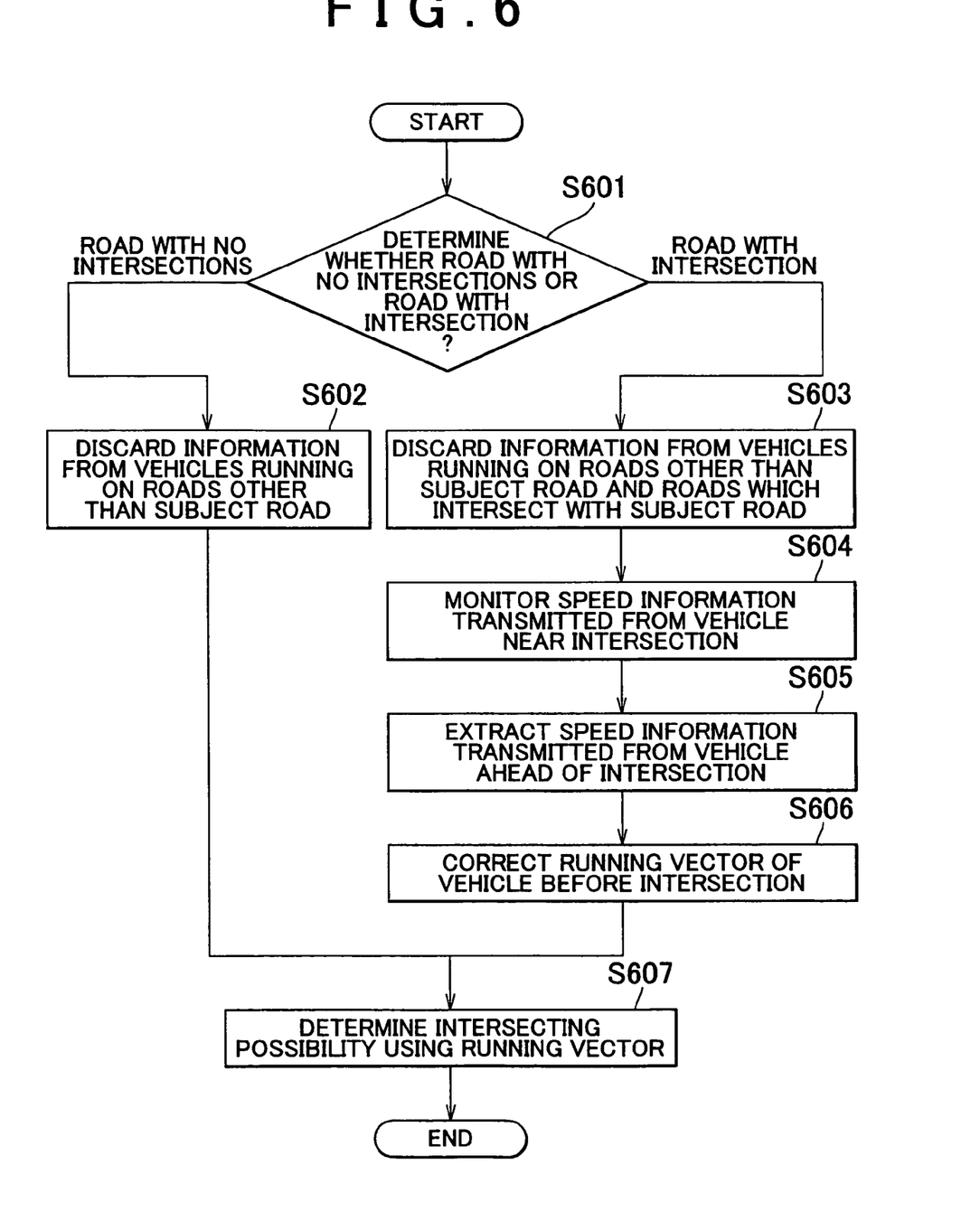
FIG. 6 is a flowchart showing an intersecting possibility determining process performed by a driving support apparatus according to a second embodiment of the invention.

FIG. 6 is a flowchart showing a process of the intersecting possibility determination (S304 in FIG. 3) according to the embodiment. The processes performed in S601 to S603 and S607 are the same as those in S401 to S404 in FIG. 4. Accordingly, the description will be omitted.

Information transmitted from the vehicles running on the roads other than the subject road and the road which intersects with the subject road is discarded (S603), afterwhich speed information (the length of the running vector concerning the vehicle) transmitted from a vehicle near the intersection ahead of the host vehicle is monitored (S604). Then, speed information (the length of the running vector concerning the vehicle) transmitted from the vehicle ahead of the intersection, which has crossed the intersection and is moving away from the intersection, is extracted from the monitored speed information (S605).

Based on the extracted speed information, as mentioned above, when it is determined that the road ahead of the intersection is congested, the lengths of the running vectors of the vehicles before the intersection (including the host vehicle) are corrected so as to be shorter. On the other hand, when it is determined that the congestion in the road ahead of the intersection is being reduced, the lengths of the running vectors of the vehicles before the intersection (including the host vehicle) are corrected so as to be longer (S606). As it is apparent to those skilled in the art, an amount of correction may be set arbitrarily.

After correcting the running vectors, intersecting possibility determination is made using the running vectors (S607). Accordingly, even in the case where there is a vehicle which is approaching the intersection and whose estimated path will intersect with the estimated path of the host vehicle if the other vehicle continues running at a speed transmitted as the speed information, when it can be estimated that the other vehicle will decelerate or stop in a while, it can be determined that there is no intersecting possibility. On the other hand, even in the case where there is a vehicle which is approaching the intersection and whose estimated path will not intersect with the estimated path of the host vehicle if the other vehicle continues running at a speed transmitted as the speed information, when it can be estimated that the other vehicle will accelerate in a while, it can be determined that there is an intersecting possibility.

According to the embodiment, even in the vehicle without a map database, the running path and traffic situation near the host vehicle can be obtained. Accordingly it is possible to provide the driver with appropriate information on the vehicle whose estimated path will intersect with the estimated path of the host vehicle.

The driving support apparatus according to the first embodiment or the second embodiment may include an image capturing portion, such as a camera which captures an image of an area ahead of the host vehicle. Presence or absence of an intersection or a manner in which a road curves can be obtained from the image information on the area ahead of the vehicle, which is obtained by the image capturing portion. The obtained information is useful for estimating running path. As it is apparent to those skilled in the art, the image information may be used for estimating the running path along with the running vector, may be used for confirming the running path estimated based on the running vector, or may be used as information for estimating the running path instead of the running vector when traffic is light and the running vectors cannot be obtained sufficiently.

In the descriptions of the first and second embodiments, the case where it is determined in one host vehicle whether an estimated path of one other vehicle will intersect with the estimated path of the host vehicle is mainly mentioned. However, as it is apparent to those skilled in the art from the drawings and the description, the number of the vehicles which transmit the running data such as positional information and speed information may be plural, and the number of vehicles which receive the information may be plural. The transmission and reception of the information can be performed respectively and simultaneously. Accordingly, one vehicle can obtain the situation around the vehicle in more detail by collecting running data from many other vehicles.

In the functional block diagram in FIG. 1, the driving support apparatus 100 including both a transmission system for transmitting positional information and speed information on the host vehicle, and a reception system for estimating the running path based on the positional information and the speed information which are transmitted from the other vehicle. However, as it is apparent to those skilled in the art, in the driving support system according to the invention, there may be a driving support apparatus having only the transmission system and a vehicle including the driving support apparatus having only the transmission system. Also, there may be a driving support apparatus having only the reception system and a vehicle including the driving support apparatus having only the reception system.

Further, as it is apparent to those skilled in the art, the components shown in the functional block in FIG. 1 and the other known components which are not shown in the figure due to obviousness thereof to those skilled in the art may be realized using at least one piece of hardware, may be realized using software, or may be realized by combination of at least one piece of hardware and software.

As described so far, according to the invention, it is possible to provide a driving support system and a driving support apparatus for a vehicle which can estimate running path based on positional information transmitted from another vehicle and which can accurately determine the possibility that an estimated path of the other vehicle will intersect with an estimated path of a host vehicle, even in the vehicle without a map database.

What is claimed is:

1. A driving support system, comprising:
   a first vehicle which can receive running data; and
   at least one second vehicle which can transmit the running data to the first vehicle;
   wherein, in the first vehicle, a running path of the second vehicle is estimated based on plural pieces of positional information included in the running data transmitted from the second vehicle, a possibility that a running vector of the second vehicle, which is prepared based on positional information and speed information on the second vehicle, will intersect with a running vector of the first vehicle is determined using the estimated running path, and the running vector of the second vehicle is corrected using velocity information on a third vehicle running ahead of the second vehicle.

2. The driving support system according to claim 1, wherein if it is estimated using velocity information on the third vehicle that a speed of the second vehicle will decrease, a length of the running vector of the second vehicle is corrected to decrease, and if it is estimated that the speed of the second vehicle will increase, the length of the running vector of the second vehicle is corrected to increase.

3. The driving support system according to claim 1, wherein the first vehicle is running on a running path and approaching an intersection, and the second vehicle is running on another running path which intersects with the running path of the first vehicle and approaching the intersection, and the third vehicle is running ahead of the second vehicle on the another running path and is moving away from the intersection.

4. A driving support apparatus which is provided in a first vehicle and which is used in a system that uses running data of at least one second vehicle, that is transmitted from the second vehicle, comprising:
   a communication portion which receives positional information and speed information on the second vehicle,
   an extracting portion which prepares vector mapping data including plural running vectors based on the plural pieces of positional information and speed information transmitted from the second vehicle, and which extracts a running path of the second vehicle from the prepared vector mapping data, and
   a determining portion which determines a possibility that a running vector of the second vehicle, that is prepared based on positional information and speed information on the second vehicle, will intersect with a running vector of the first vehicle using the extracted running path,
   wherein the determining portion determines the possibility that the running vector of the second vehicle will intersect with the running vector of the first vehicle, after correcting the running vector of the second vehicle using velocity information on a third vehicle running ahead of the second vehicle.

5. The driving support apparatus according to claim 4, further comprising:
   an image capturing portion which captures an image of an area ahead of the first vehicle and which generates image information on the area ahead of the first vehicle,
   wherein the determining portion determines the possibility that the running vector of the second vehicle will intersect with the running vector of the first vehicle using the extracted running path and the image information obtained by the image capturing portion.

6. The driving support apparatus according to claim 4, wherein if it is estimated using velocity information on the third vehicle that a speed of the second vehicle will decrease, a length of the running vector of the second vehicle is corrected to decrease, and if it is estimated that the speed of the second vehicle will increase, the length of the running vector of the second vehicle is corrected to increase.

7. The driving support apparatus according to claim 4, wherein the first vehicle is running on a running path and approaching an intersection, and the second vehicle is running on another running path which intersects with the running path of the first vehicle and approaching the intersection, and the third vehicle is running ahead of the second vehicle on the another running path and is moving away from the intersection.

8. A driving support apparatus which is provided in a first vehicle and which is used in a system that uses running data of at least one second vehicle, that is transmitted from the second vehicle, comprising:
   a communication portion which receives positional information and speed information on the second vehicle,
   extracting means for preparing vector mapping data including plural running vectors based on the plural pieces of positional information and speed information transmitted from the second vehicle, and for extracting a running path of the second vehicle from the prepared vector mapping data, and
   determining means for determining a possibility that a running vector of the second vehicle, that is prepared based on positional information and speed information on the second vehicle, will intersect with a running vector of the first vehicle using the extracted running path,
   wherein the determining means determines the possibility that the running vector of the second vehicle will intersect with the running vector of the first vehicle, after correcting the running vector of the second vehicle using velocity information on a third vehicle running ahead of the second vehicle.

9. The driving support apparatus according to claim 8, further comprising:
   image capturing means for capturing an image of an area ahead of the first vehicle and for generating image information on the area ahead of the first vehicle,
   wherein the determining means determines the possibility that the running vector of the second vehicle will intersect with the running vector of the first vehicle using the running path extracted by the extracting means and the image information on the area ahead of the first vehicle, obtained by the image capturing means.

10. The driving support apparatus according to claim 8, wherein if it is estimated using velocity information on the third vehicle that a speed of the second vehicle will decrease, a length of the running vector of the second vehicle is corrected to decrease, and if it is estimated that the speed of the second vehicle will increase, the length of the running vector of the second vehicle is corrected to increase.

11. The driving support apparatus according to claim 8, wherein the first vehicle is running on a running path and approaching an intersection, and the second vehicle is running on another running path which intersects with the running path of the first vehicle and approaching the intersection, and the third vehicle is running ahead of the second vehicle on the another running path and is moving away from the intersection.

12. A driving support method in which a first vehicle uses running data of at least one second vehicle, that is transmitted from the second vehicle, comprising:
   a first step of receiving positional information and speed information on the second vehicle;
   a second step of preparing vector mapping data including plural running vectors based on the plural pieces of positional information and speed information transmitted from the second vehicle;
   a third step of extracting a running path of the second vehicle from the prepared vector mapping data; and
   a fourth step of determining a possibility that a running vector of the second vehicle, that is prepared based on positional information and speed information on the second vehicle, will intersect with a running vector of the first vehicle using the extracted running path,
   wherein, in the fourth step, the possibility that that the running vector of the second vehicle will intersect with the running vector of the first vehicle is determined, after correcting the running vector of the second vehicle using velocity information on a third vehicle running ahead of the second vehicle.

13. The driving support method according to claim 12, further comprising:
   a fifth step of capturing an image of an area ahead of the first vehicle and generating image information on the area ahead of the first vehicle, wherein, in the fourth step, the possibility that the running vector of the second vehicle will intersect with the running vector of the first vehicle is determined using the running path extracted in the third step and the image information on the area ahead of the first vehicle.

14. The driving support method according to claim 12, further comprising, if it is estimated using velocity information on the third vehicle that a speed of the second vehicle will decrease, correcting a length of the running vector of the second vehicle to decrease, and if it is estimated that the speed of the second vehicle will increase, correcting the length of the running vector of the second vehicle to increase.

15. The driving support method according to claim 12, wherein the first vehicle is running on a running path and approaching an intersection, and the second vehicle is running on another running path which intersects with the running path of the first vehicle and approaching the intersection, and the third vehicle is running ahead of the second vehicle on the another running path and is moving away from the intersection.

* * * * *